(12) United States Patent
Zhou et al.

(10) Patent No.: US 10,414,963 B2
(45) Date of Patent: Sep. 17, 2019

(54) HIGH-TEMPERATURE CROSSLINKED POLYMER FOR USE IN A WELL

(71) Applicant: Halliburton Energy Services, Inc., Houston, TX (US)

(72) Inventors: Hui Zhou, The Woodlands, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 351 days.

(21) Appl. No.: 13/927,425

(22) Filed: Jun. 26, 2013

(65) Prior Publication Data
US 2015/0005206 A1    Jan. 1, 2015

(51) Int. Cl.
| | | |
|---|---|---|
| C09K 8/512 | (2006.01) |
| E21B 21/00 | (2006.01) |
| C09K 8/508 | (2006.01) |
| C09K 8/035 | (2006.01) |
| C09K 8/42 | (2006.01) |
| C09K 8/50 | (2006.01) |
| C09K 8/62 | (2006.01) |
| C09K 8/68 | (2006.01) |
| C09K 8/88 | (2006.01) |

(52) U.S. Cl.
CPC ............. *C09K 8/035* (2013.01); *C09K 8/42* (2013.01); *C09K 8/50* (2013.01); *C09K 8/62* (2013.01); *C09K 8/685* (2013.01); *C09K 8/882* (2013.01); *C09K 8/887* (2013.01)

(58) Field of Classification Search
None
See application file for complete search history.

(56) References Cited

U.S. PATENT DOCUMENTS

| | | | |
|---|---|---|---|
| 3,336,981 A * | 8/1967 | Barron ............... | C06B 47/00 149/118 |
| 4,066,583 A | 1/1978 | Spaulding | |
| 4,471,097 A | 9/1984 | Uhl et al. | |
| 4,678,591 A | 7/1987 | Giddings et al. | |
| 5,239,053 A * | 8/1993 | Tseng ................. | C08F 6/003 528/483 |
| 5,306,795 A | 4/1994 | Shih et al. | |
| 5,620,947 A | 4/1997 | Elward-Berry | |
| 5,789,349 A | 8/1998 | Patel | |
| 6,130,304 A * | 10/2000 | Sumiya ............... | C08F 220/06 526/317.1 |
| 6,465,397 B1 * | 10/2002 | Patterson ............ | C08F 220/56 507/222 |
| 6,590,050 B1 | 7/2003 | Bair et al. | |
| 7,098,171 B2 | 8/2006 | Thaemlitz | |
| 8,343,896 B2 | 1/2013 | Eoff et al. | |
| 2003/0213593 A1 | 11/2003 | Bouwmeester et al. | |
| 2004/0229755 A1 | 11/2004 | Thaemlitz | |
| 2005/0080176 A1 | 4/2005 | Robb | |
| 2007/0054811 A1 | 3/2007 | Reddy et al. | |
| 2007/0179064 A1 | 8/2007 | Jarrett et al. | |
| 2007/0256836 A1 | 11/2007 | Welton et al. | |
| 2008/0135247 A1 | 6/2008 | Hutchins | |
| 2008/0223596 A1 | 9/2008 | Ezell et al. | |
| 2010/0210482 A1 * | 8/2010 | Fox .................... | C09K 8/12 507/129 |
| 2010/0256018 A1 * | 10/2010 | Ezell ................. | C09K 8/512 507/119 |
| 2011/0168393 A1 | 7/2011 | Ezell et al. | |
| 2011/0180256 A1 | 7/2011 | Tehrani et al. | |
| 2011/0237468 A1 | 9/2011 | Reichenbach-Klinke et al. | |

(Continued)

FOREIGN PATENT DOCUMENTS

| | | |
|---|---|---|
| WO | 97/31041 A1 | 8/1997 |
| WO | 2005/068777 A2 | 7/2005 |

(Continued)

OTHER PUBLICATIONS

International Search Report and Written Opinion issued in related PCT Application No. PCT/US2014/033591, dated Aug. 22, 2014 (14 pages).

International Preliminary Report on Patentability issued in related PCT Application No. PCT/US2014/033591 dated Jan. 7, 2016 (11 pages).

Official Action issued in related Danish application No. 17/11/2015, dated Mar. 17, 2016 (8 pages).

(Continued)

*Primary Examiner* — Jeffrey D Washville
(74) *Attorney, Agent, or Firm* — Tenley Krueger; Baker Botts L.L.P.

(57) ABSTRACT

A method comprising the steps of: (A) forming a fluid comprising a crosslinked polymer, wherein the crosslinked polymer comprises: (i) a first monomeric unit of one or more N-vinyl lactams; and (ii) a crosslinker selected from the group consisting of: divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), and any combination of any of the foregoing; and (B) introducing the fluid into a portion of a well. The crosslinked polymer may additionally comprise: a second monomeric unit selected from the group consisting of: acrylamide, N-substituted acrylamides, methacrylamide, N-substituted methacrylamides, acrylates, methacrylates, acrylic acid, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, and any combination of any of the foregoing.

13 Claims, No Drawings

(56) References Cited

U.S. PATENT DOCUMENTS

| | | | |
|---|---|---|---|
| 2011/0243873 A1* | 10/2011 | Hough | A61K 8/91 424/70.16 |
| 2012/0012325 A1 | 1/2012 | Carman | |
| 2012/0077718 A1 | 3/2012 | Yang et al. | |
| 2013/0105161 A1 | 5/2013 | Funkhouser et al. | |
| 2014/0364511 A1* | 12/2014 | Chari | C09K 8/035 514/772.6 |
| 2016/0272868 A1* | 9/2016 | Wang | C09K 8/512 |

FOREIGN PATENT DOCUMENTS

| | | | |
|---|---|---|---|
| WO | 2007059857 A1 | 5/2007 |
| WO | 2008156970 A1 | 12/2008 |
| WO | 2012150431 A1 | 11/2012 |
| WO | 2013040167 A1 | 3/2013 |
| WO | 2013040178 A1 | 3/2013 |

OTHER PUBLICATIONS

Extended European Search Report issued in related European Application No. 14817078.0, dated Dec. 15, 2016 (7 pages).

\* cited by examiner

HIGH-TEMPERATURE CROSSLINKED POLYMER FOR USE IN A WELL

CROSS-REFERENCE TO RELATED APPLICATIONS

Not applicable.

TECHNICAL FIELD

The inventions are in the field of producing crude oil or natural gas from subterranean formations. More specifically, the inventions generally relate to compositions of crosslinked polymers and methods of using such compositions as viscosifiers and fluid-loss control additives in drilling and treatment fluids for subterranean applications.

BACKGROUND

Various patents and papers have been issued and published for developing synthetic polymers for water-based drilling fluids that offer desired rheology control as well as fluid-loss control for high-temperature applications up to 260° C. (500° F.) (if lasts 16 hours at 204° C. (400° F.). These polymers are generally linear or lightly crosslinked (less than 1 mol % crosslinker) and need to be used with clay to achieve desired viscosity and fluid-loss control. The use of clay, however, can cause severe formation damage because it plugs the pores of the reservoir formation and is very difficult to be cleaned up. Without clay, unfortunately, these polymers alone cannot provide desired viscosity and fluid-loss control.

US Patent Publication No. 20110168393 discloses a crosslinked homopolymer of polyacrylamide as high-temperature fluid-loss additive. The crosslinkers are either diethylene glycol dimethacrylate, N,N'-ethylenebisacrylamide, or polyethylene glycol diacrylate. Two issues remain for this polymer. First, since the polymer is a homopolymer of acrylamide, it is not compatible with the sized calcium carbonate (bridging agent) after aging because the polymer hydrolyzes to polyacrylate. As a result, the calcium carbonate bridging agent and the polymer precipitate out of the mud formulation after aging. Second, the crosslinkers can also be hydrolyzed after aging, resulting loss of viscosity and fluid loss control.

SUMMARY OF THE INVENTION

According to the invention, a crosslinked polymer is provided, wherein the crosslinked polymer comprises at least: (i) a first monomeric unit of one or more N-vinyl lactams; and (ii) a crosslinker selected from the group consisting of: divinyl ether, diallyl ether, vinyl or allyl ethers of polyglycols or polyols, divinylbenzene, 1,3-divinylimidazolidin-2-one (also known as 1,3-divinylethyleneurea or divinylimidazolidone), divinyltetrahydropyrimidin-2(1H)-one, dienes, allyl amines, N-vinyl-3(E)-ethylidene pyrrolidone, ethylidene bis(N-vinylpyrrolidone), and any combination of any of the foregoing.

Preferably, the crosslinked polymer additionally comprises: a second monomeric unit selected from the group consisting of: acrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, and diallyldimethylammonium chloride, and any combination of any of the foregoing.

According to an embodiment of the invention, a fluid for use in a well is provided, the fluid comprising a crosslinked polymer according to the invention.

According to another embodiment of the invention, a method is provided comprising the steps of: (A) forming a drilling or treatment fluid comprising a crosslinked polymer according to the invention; and (B) introducing the drilling or treatment fluid into a portion of a well.

A crosslinked polymer according to the invention for use in a composition or a method according to the invention can be provided in the form of a dry powder or in the form of water-in-oil emulsion, which may then be used, for example, to formulate a drilling fluid or treatment fluid for use in a well. In the case of water-in-oil emulsion, the polymer is a microgel dispersed in a continuous oil phase.

For example, in an embodiment the crosslinked polymer can be used to formulate a drilling or treatment fluid, wherein the fluid comprises the crosslinked polymer and water. Preferably, the crosslinker polymer and water are part of a liquid or gel phase. Preferably, a continuous phase of the fluid is the liquid or gel phase.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist" of the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Services

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids, such as oil or gas, from or through a subterranean formation. A well service usually involves introducing a fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Completion is the process of making a well ready for production or injection. This principally involves preparing a zone of the wellbore to the required specifications, running in the production tubing and associated downhole equipment, as well as perforating and stimulating as required.

Intervention is any operation carried out on a well during or at the end of its productive life that alters the state of the well or well geometry, provides well diagnostics, or manages the production of the well.

Workover can broadly refer to any kind of well intervention that involves invasive techniques, such as wireline, coiled tubing, or snubbing. More specifically, however, workover usually refers to a process of pulling and replacing a completion.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a line pipe, and a transportation pipe.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular, such as a production tubing string, and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 200 barrels (about 8,400 US gallons or about 32 m$^3$), it is sometimes referred to as a wash, dump, slug, or pill.

Drilling fluids, also known as drilling muds or simply "muds," are typically classified according to their base fluid, that is, the nature of the continuous phase. A water-based mud ("WBM") has a water phase as the continuous phase. The water can be brine. A brine-based drilling fluid is a water-based mud in which the aqueous component is brine. In some cases, oil may be emulsified in a water-based drilling mud. An oil-based mud ("OBM") has an oil phase as the continuous phase. In some cases, a water phase is emulsified in the oil-based mud.

A drill-in fluid is a drilling mud adapted to drill into or through a reservoir. A purpose of a drill-in fluid is to minimize damage to the reservoir and provide for easier clean up. A drill-in fluid may more closely resemble a treatment fluid used during completion. For example, it may be a brine containing only selected solids of appropriate particle size ranges (salt crystals or calcium carbonate) and polymers. Only additives essential for filtration control and cuttings carrying are normally used in a drill-in fluid.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

Fluid loss refers to the undesirable leakage of a fluid phase of any type of fluid into the permeable matrix of a zone, which zone may or may not be a treatment zone. Fluid-loss control refers to treatments designed to reduce such undesirable leakage.

Fluid-loss control materials are sometimes used in drilling fluids or in treatment fluids. A fluid-loss control pill is a treatment fluid that is designed or used to provide some degree of fluid-loss control. A fluid-loss control pill is usually used prior to introducing another drilling fluid or treatment fluid into zone.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Substances, Chemicals, Polymers, and Derivatives

A substance can be a pure chemical or a mixture of two or more different chemicals. A pure chemical is a sample of matter that cannot be separated into simpler components without chemical change. A chemical compound is formed from different elements chemically combined in definite proportions by mass. A chemical element is composed of atoms with identical atomic number.

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, e.g., terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Phases, Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), e.g., microscopic clay particles, to about 3 millimeters, e.g., large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

As used herein, a fiber is a particle or grouping of particles having an aspect ratio L/D greater than 5/1.

A particulate will have a particle size distribution ("PSD"). As used herein, "the size" of a particulate can be determined by methods known to persons skilled in the art.

One way to define the particle size distribution width is to cite three values, the d(0.10), d(0.50), and the d(0.90). The d(0.50), which is sometimes referred to as the "D50" or the median particle size, is defined as the diameter where half of the particles are smaller and half are larger than the size. Similarly, 10 percent of the distribution lies below the d(0.10) or "D10" size, and 90 percent of the distribution lies below the d(0.90) or "D90" size.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

Fluids

A fluid can be a homogeneous or heterogeneous. In general, a fluid is an amorphous substance that is or has a continuous phase of particles that are smaller than about 1 micrometer that tends to flow and to conform to the outline of its container. Examples of fluids are gases and liquids.

Every fluid inherently has at least a continuous phase. A fluid can have more than one phase. The continuous phase of a drilling or treatment fluid is a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

In the context of a fluid, oil is understood to refer to any kind of oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. All oils, even synthetic oils, can be traced back to organic sources.

Continuum Mechanics and Rheology

One of the purposes of identifying the physical state or phase of a substance and measuring viscosity or other physical characteristics of a fluid is to establish whether it is pumpable. In the context of oil and gas production, the pumpability of a fluid is with particular reference to the ranges of physical conditions that may be encountered at a wellhead and with the types and sizes of pumps available to be used for pumping fluids into a well. Another purpose is to determine what the physical state of the substance and its physical properties will be during pumping through a wellbore and under other downhole conditions in the well, including over time and changing temperatures, pressures, and shear rates.

Continuum mechanics is a branch of mechanics that deals with the analysis of the kinematics and the mechanical behavior of materials modeled as a continuous mass on a large scale rather than as distinct particles. Fluid mechanics is a branch of continuum mechanics that studies the physics of continuous materials that take the shape of their container. Rheology is the study of the flow of matter: primarily in the liquid state, but also as "soft solids" or solids under conditions in which they respond with plastic flow rather than deforming elastically in response to an applied force. It applies to substances that have a complex structure, such as fluid suspensions, gels, etc. The flow of such substances cannot be fully characterized by a single value of viscosity, which varies with temperature, pressure, and other factors. For example, ketchup can have its viscosity reduced by shaking (or other forms of mechanical agitation) but water cannot.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary, the flow speed must equal that of the fluid. The region between these two points is named the boundary layer.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Therefore, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Like other physical properties, the viscosity of a Newtonian fluid or the apparent viscosity of a non-Newtonian fluid may be highly dependent on the physical conditions, primarily temperature and pressure.

Gels and Deformation

Technically, the physical state of a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

A "hydrogel" is a gel state having a network of polymer chains that are hydrophilic and for which water is the dispersion medium. In some cases, a "hydrogel" refers to a natural or synthetic polymeric material that is a highly absorbent and that can form such a gel.

A "microgel" is a colloidal dispersion of gel-state particles comprising chemically cross-linked three-dimensional polymer networks that that are swollen in a suitable solvent. Depending on the polymeric material, a microgel may be able to dramatically swell or shrink in response to a variety of external stimuli, such as temperature, pH, ionic strength, electric field, and enzyme activities.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Gel Measurements (for Drilling Applications)

For drilling fluids, the following properties are usually considered: plastic viscosity ("PV"), yield point ("YP") (at least 6-rpm and 3-rpm readings), gel strength (at 10 seconds and 10 minutes), and filtrate volume (a measure of fluid-loss control).

Viscosity Measurements (e.g., for Hydraulic Fracturing Applications)

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ Model 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

A substance is considered to be a fluid if it has an apparent viscosity less than 5,000 mPa·s (cP) (independent of any gel characteristic). For reference, the viscosity of pure water is about 1 mPa·s (cP).

Damage to Subterranean Formation

The term "damage" as used herein regarding a formation refers to undesirable deposits in a subterranean formation that may reduce its permeability. Scale, skin, gel residue, and hydrates are contemplated by this term. Also contemplated by this term are geological deposits, such as, but not limited to, carbonates located on the pore throats of a sandstone formation.

After application of a filtercake, it may be desirable to restore permeability into the formation. If the formation permeability of the desired producing zone is not restored, production levels from the formation can be significantly lower. Any filtercake or any solid or polymer filtration into the matrix of the zone resulting from a fluid-loss control treatment must be removed to restore the formation's permeability, preferably to at least its original level. This is often referred to as clean up.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

If all that is needed is to convert a volume in barrels to a volume in cubic meters without compensating for temperature differences, then 1 bbl equals 0.159 m$^3$ or 42 U.S. gallons.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m$^3$) is: 1 lb/gal=(0.4536 kg/lb)×(gal/0.003785 m$^3$)=120 kg/m$^3$.

The conversion between pound per thousand gallons (lb/Mgal) and kilogram per cubic meter (kg/m$^3$) is: 1 lb/Mgal=(0.4536 kg/lb)×(Mgal/3.785 m$^3$)=0.12 kg/m$^3$.

The conversion between pound per barrel (lb/bbl) and kilogram per cubic meter (kg/m$^3$) is: 1 lb/bbl=(0.4536 kg/lb)×(bbl/0.159 m$^3$)=2.85 kg/m$^3$.

The conversion between pound per square foot (lb/ft$^2$) and kilogram per square meter (kg/m$^2$) is: 1 lb/ft$^2$=4.9 kg/m$^2$.

General Approach

The invention provides crosslinked polymers, which can be used for example, as viscosifiers or fluid-loss control additives for high-temperature well-servicing fluids.

Crosslinked Polymer

According to the invention, a crosslinked polymer is provided, wherein the crosslinked polymer comprises at least: (i) a first monomeric unit of one or more N-vinyl lactams; and (ii) a crosslinker selected from the group consisting of: divinyl ether, diallyl ether, vinyl or allyl ethers of polyglycols or polyols (such as pentaerythritol allyl ether (PAE), allyl sucrose, ethylene glycol divinyl ether, triethylene glycol divinyl ether, diethylene glycol divinyl ether, glycerol diallyl ether, and polyethylene glycol divinyl ether, propylene glycol divinyl ether, and trimethylolpropane diallyl ether), divinylbenzene, 1,3-divinylimidazolidin-2-one (also known as 1,3-divinylethyleneurea or divinylimidazolidone), divinyltetrahydropyrimidin-2(1H)-one, dienes (such as 1,7-octadiene and 1,9-decadiene), allyl amines (such as triallylamine and tetraallylethylene diamine), N-vinyl-3(E)-ethylidene pyrrolidone, ethylidene bis(N-vinylpyrrolidone), and any combination of any of the foregoing.

Preferably, the crosslinked polymer additionally comprises: a second monomeric unit selected from the group consisting of: acrylamide, N-substituted acrylamides (such as 2-acrylamido-2-methylpropanesulfonic acid (AMPS), N-ethylacrylamide, N-isopropylacrylamide, N,N-dimethylacrylamide, N-hydroxyethylacrylamide, and, dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates, allyl sulfonates, vinylimidazole, allylimidazole, and diallyldimethylammonium chloride.

According to an embodiment of the invention, a fluid for use in a well is provided, the fluid comprising a crosslinked polymer according to the invention.

According to another embodiment of the invention, a method is provided comprising the steps of: (A) forming a drilling or treatment fluid comprising a crosslinked polymer according to the invention; and (B) introducing the drilling or treatment fluid into a portion of a well.

A crosslinked polymer according to the invention for use in a composition or a method according to the invention can be provided in the form of a dry powder or in the form of water-in-oil emulsion, which may then be used, for example, to formulate a drilling fluid or treatment fluid for use in a well. In the case of water-in-oil emulsion, the polymer is a microgel dispersed in a continuous oil phase.

For example, in an embodiment the crosslinked polymer can be used to formulate a drilling or treatment fluid, wherein the fluid comprises the crosslinked polymer and water. Preferably, the crosslinker polymer and water are part of a liquid or gel phase. Preferably, a continuous phase of the fluid is the liquid or gel phase. For our examples, the polymer is first obtained for use in a dry powder form, but it can also be obtained in the form of a water-in-oil emulsion, in which a polymer microgel (that is, micro-sized hydrogel particulate) is dispersed in the continuous oil phase.

The crosslinked polymers according to the invention can provide desirable viscosity and fluid-loss control after simulated aging under well circulating conditions at temperatures of 204° C. (400° F.) for 16 hours. Unlike an acrylamide homopolymer, such a polymer is also compatible for use in divalent brines even at such high temperatures and durations. Accordingly, the polymers are expected to usable at temperatures up to about 260° C. (500° F.), although for shorter durations. In addition, the polymers can provide such desirable rheological properties without the need of clay being included in the fluid.

Without being limited by any hypothetical explanation, it is believed the acrylamide monomers and derivatives thereof tend to hydrolyze at high temperatures, causing a homopolymer of such monomers to become less effective as a viscosifier in brine, and even causing the hydrolyzed polymeric material to precipitate from the aqueous phase, especially in a divalent brine.

The inclusion of an N-vinyl lactam as a monomeric unit provides a polymer with the acrylamide or derivative thereof that is more thermally stable than a homopolymer of acrylamide or derivative thereof. Without being limited by any hypothetical explanation, it is believed an N-vinyl lactam monomeric unit helps reduce the hydrolysis of the acrylamide group. This may be due to stearic blocking of the acrylamide group. Even though part of the acrylamide group is hydrolyzed, the N-vinyl lactam monomeric unit in the polymer keeps the polymer from precipitating out from the solution. This helps maintain desired rheological properties at high temperatures.

Preferably, the first monomeric unit is N-vinylpyrrolidone (NVP). Another suitable example of the first monomeric unit includes N-vinylcaprolactam.

Preferably, the first monomeric unit is at least 5 mol % of the polymeric units of the polymer. More preferably, the first monomeric unit is in the range of about 30 mol % to about 100% of the polymeric units of the polymer.

Preferably, the second monomeric unit is in the range of about 0 mol % to about 90 mol % of the polymeric units of the polymer. More preferably, the second monomeric unit is in the range of about 0 mol % to about 70 mol % of the polymeric units of the polymer.

Preferably, the crosslinker is in the range of 0.05 mol % to 5 mol % of a total of the first and first monomeric units of the polymer. More preferably, the crosslinker is in the range of 0.1 mol % to 3 mol % of a total of the first and first monomeric units.

Hydrated or Water-Containing Phase

In an embodiment, the composition additionally comprises water. Preferably, the crosslinker polymer and water are part of a liquid or gel phase. Preferably, the composition as a whole is in the form of a fluid or gel. Most preferably, a continuous phase of the fluid is the liquid or gel phase.

In an embodiment, a method is provided comprising the steps of: (A) forming a drilling or treatment fluid comprising the composition; and (B) introducing the drilling or treatment fluid into a portion of a well.

Salts or Brine

Preferably, a composition according to the invention additionally comprises one or more water-soluble salts dissolved in the water. For example, the one or more salts can be selected from the group of inorganic salts, formate salts, or any combination thereof. Inorganic salts can be selected from the group of monovalent salts, which can be further selected from the group consisting of: alkali metal halides, ammonium halides, and any combination thereof. Inorganic salts can also be selected from the group of divalent salts, such as alkaline earth metal halides and zinc halides. Monovalent salts can be used to form drilling or treatment fluids having an aqueous phase having a density up to about 12.5 lb/gal. Divalent salts and formate salts can be used to form drilling or treatment fluids having an aqueous phase having a density up to about 19.2 lb/gal. In various embodiments, the one or more inorganic salts are in a sufficient concentration such that the density of the aqueous phase is in the range of about 9 lb/gal to about 19.2 lb/gal. In some embodiments according to the invention, the one or more inorganic salts are selected and in a sufficient concentration such that the density of the aqueous phase is greater than about 9.5 lb/gal. In some embodiments according to the invention, the one or more inorganic salts are selected and in a sufficient concentration such that the density of the aqueous phase is greater than about 13 lb/gal.

Polymer Stability in Brine or at High Temperature

Hot rolling is a laboratory technique to simulate downhole circulating at a design temperature for a design time.

As used herein, high temperature means at least 149° C. (300° F.). Biopolymers tend to degrade at temperatures above about 177° C. (350° F.). A hydrogel according to the invention can be adapted to be thermally stable to hot rolling up to at least 204° C. (400° F.) for at least 16 hours. In certain embodiments, a hydrogel according to the invention can be adapted to be thermally stable to hot rolling up to at least 218° C. (425° F.) for at least 4 hours. A thermal stabilizer can be used to help maintain the stability of a polymeric material used to form a hydrogel.

Unlike an acrylamide homopolymer, a polymer according to the invention can remain soluble in a brine and not precipitate out of the solution even after aging at 204° C. (400° F.) for 16 hours.

Applications for Polymers

A polymer or hydrogel according to the invention can be used for rheology modification in various well applications, including, for example, drilling fluids, completion fluids, fluid-loss treatment, and cementing.

Particulate in Treatment Fluid

In certain applications, the treatment fluid can include a particulate. A particulate can serve various purposes, including, for example, fluid-loss control.

Bridging Agent

A fluid according to the invention can include a bridging agent. A bridging agent is a particulate used to help prevent leak off by plugging the pore throats of a permeable subterranean formation.

Preferably, the bridging agent is a degradable material. For example, the bridging agent can be calcium carbonate, which can be dissolved in an acidic solution for clean up of formation damage.

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The terms "degradable" or "degradation" refer to both the two relatively extreme cases of degradation that the degradable material may undergo, that is, heterogeneous (or bulk erosion) and homogeneous (or surface erosion), and any stage of degradation in between these two.

Preferably, the degradable material degrades slowly over time under the design conditions in the well as opposed to instantaneously.

The degradation can be a result of, inter alia, a chemical or thermal reaction or a reaction induced by radiation. The degradable material is preferably selected to degrade by at least one mechanism selected from the group consisting of: hydrolysis, hydration followed by dissolution, dissolution, decomposition, or sublimation.

Degradable particulate can include or consist essentially of degradable materials. For example, a degradable material can be selected from the group consisting of: polysaccharides such as dextran or cellulose; chitins; chitosans; proteins; aliphatic polyesters; poly(lactides); poly(glycolides); poly(glycolide-co-lactides); poly(ε-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; and any combination of any of the foregoing.

A bridging agent can be included in a drilling or treatment fluid in a concentration necessary to help provide a desired fluid-loss control. In some embodiments, a bridging agent can be included in a concentration of about 5 to about 200 pounds per barrel of the treatment fluid. In some embodiments, the bridging agent can be included in a concentration from about 10 to about 100 pounds per barrel of the treatment fluid.

Proppant or Gravel

In certain applications, a hydrogel fluid can be used to help suspend and carry a particulate that is used in stimulation or completion operations. For example, a fluid can be used in a hydraulic fracturing operation to carry a proppant. Or a fluid can be used in a gravel packing operation to carry gravel to form a screen for sand control.

Examples of particulates that can be used for such purposes include sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate. In addition, particulate that has been chemically treated or coated can be used. For example, a proppant or gravel can be coated with a curable resin or tackifying agent. The term "coated" does not imply any particular degree of coverage of the particulates.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant or gravel in a treatment fluid depends on the nature of the subterranean formation to be treated. For example, as the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

Avoid Clay

Preferably, the composition with water less than 2% clay by weight of the water. Most preferably, the composition does not include any clay, which can be damaging to a production zone and difficult to clean up.

Other Fluid Additives

A fluid can contain additives that are commonly used in oil field applications, as known to those skilled in the art. These include, but are not necessarily limited to, brines, inorganic water-soluble salts, salt substitutes (such as tetramethyl ammonium chloride), pH control additives, surfactants, defoamers, breakers, breaker aids, oxygen scavengers, alcohols, scale inhibitors, corrosion inhibitors, hydrate inhibitors, oxidizers, chelating agents, water-control agents (such as relative permeability modifiers), consolidating agents, proppant flowback control agents, conductivity enhancing agents, clay stabilizers, sulfide scavengers, fibers, nanoparticles, bactericides, and combinations thereof.

Of course, additives to a fluid should be selected for not interfering with the purpose of the fluid.

pH and pH Adjuster

Preferably, the pH of the aqueous phase of the drilling or treatment fluid is in the range of about 7 to about 12. More preferably, the pH of the aqueous phase is in the range of about 8 to about 11.

In certain embodiments, the fluids can include a pH-adjuster. Preferably, the pH adjuster does not have undesirable properties, as discussed above.

The pH-adjuster may be present in the treatment fluids in an amount sufficient to maintain or adjust the pH of the fluid.

In some embodiments, a pH-adjuster may be included in the treatment fluid, inter alia, to adjust the pH of the treatment fluid to, or maintain the pH of the treatment fluid near, a pH that balances the duration of certain properties of the treatment fluid (e.g., rheological properties) with the breaking of the fluid.

The pH-adjuster can be any other substance known in the art capable of maintaining the pH in a limited range. One of ordinary skill in the art, with the benefit of this disclosure, will recognize the appropriate pH-adjuster and amount thereof to use for a chosen application.

Oxygen Scavenger as Thermal Stabilizer

In certain embodiments, a stabilizer may optionally be included in the treatment fluids. It may be particularly advantageous to include a stabilizer if a chosen treatment fluid would degrade, e.g., lose viscosity, too quickly under the design conditions for the application.

Depending on the fluid, thermal stabilizers include, but are not limited to, sodium thiosulfate, methanol, and certain salts such as formate salts and potassium chloride. Another example of a suitable stabilizer includes surfactants, such as those in U.S. patent Publication No. US 20070256836 (U.S. application Ser. No. 11/418,617) entitled "Methods of treating a subterranean formation with a treatment fluid having surfactant effective to increase the thermal stability of the fluid," which is herein incorporated by reference. Such stabilizers may be useful when the treatment fluids are utilized in a subterranean formation having a temperature above about 93° C. (200° F.). Yet another example of a suitable stabilizer is disclosed in US Patent Publication 20120012325 of Baker Hughes, which claims to be effective up to about 260° C. (500° F.).

A thermal stabilizer can be added, for example, in a concentration from about 0.05 to about 5 pounds per barrel of treatment fluid. In other embodiments, a stabilizer may be included in a concentration from about 0.5 to about 4 pounds per barrel of treatment fluid.

Method of Drilling or Treating a Well with the Fluid

According to another embodiment of the invention, a method of drilling or treating a well is provided, the method including the steps of: forming a drilling or treatment fluid according to the invention; and introducing the treatment fluid into the well.

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, e.g., less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

In an embodiment, the step of introducing is at a rate and pressure below the fracture pressure of the treatment zone.

In an embodiment, the step of introducing includes circulating the fluid in the wellbore of the well while drilling.

In an embodiment, the step of introducing comprises introducing under conditions for fracturing a treatment zone. The fluid is introduced into the treatment zone at a rate and pressure that are at least sufficient to fracture the zone.

After the step of introducing a fluid according to the invention into the well, the method can include a step of allowing time for breaking the viscosity of the fluid in the well. This preferably occurs with time under the conditions in the zone of the subterranean fluid.

In an embodiment, which can be in a hydraulic fracturing application, the step of flowing back is within 7 days of the step of introducing. In another embodiment, the step of flowing back is within 1 day of the step of introducing.

Preferably, after any such use of a fluid according to the invention, a step of producing hydrocarbon from the well or a particular zone is the desirable objective.

EXAMPLES

To facilitate a better understanding of the present invention, the following examples of certain aspects of some embodiments are given. In no way should the following examples be read to limit, or define, the entire scope of the invention.

Various crosslinked polymers were prepared by precipitation copolymerization of N-vinylpyrrolidone and acrylamide at different ratios and with three different crosslinkers: N,N'-methylenebisacrylamide ("MBAM"), divinylbenzene ("DVB"), or pentaerythritol allyl ether ("PAE"). Other polymerization methods, such as dispersion polymerization, solution polymerization, and inverse emulsion polymerization, can also be used to prepare the crosslinked polymers.

Polymer Synthesis

This is a typical example of preparing an N-vinylpyrrolidone and acrylamide copolymer by precipitation polymerization in tert-butanol. To a 300 mL three-neck flask was added 8.77 g of acrylamide (0.1234 mol), 13.72 g of N-vinylpyrrolidone (0.1234 mol), 0.632 g of pentaerythritol allyl ether (0.01234 mol based on tri-allyl ether), and 190 mL of tert-butanol. The solution was purged with $N_2$ gas for about 30 minutes while heating to 60° C. Azobisisobutyronitrile (AIBN, 0.04 g in 3 mL of ethanol) was added into the solution. The reaction mixture was stirred at 60° C. for 3 hours, then at 80° C. for additional 1 hour. The mixture was then cooled down to room temperature and the precipitate was filtered to give a fluffy white powder, which was dried under vacuum at 50° C. overnight.

Polymer Evaluation

Crosslinked polymers were evaluated with a drill-in mud formulation as shown in Table 1, which has a brine density of about 9.8 ppg and a mud density of about 10.3 ppg, wherein a various crosslinked polymers were used, as described in the following examples. The trademarked products are commercially available from Halliburton Energy Services, Inc. It should be understood that the formulation shown in Table 1 is merely exemplary of many types of fluids that can be made according to the invention.

TABLE 1

Brine-based drill-in mud formulation (10.3 ppg)

| Formulation | Amount (US Customary Units) | Amount (Metric Units) |
|---|---|---|
| Water | 0.914 bbl | 145 liters |
| NaCl | 59 lb | 27 kg |
| KCl | 20 lb | 9 kg |
| BARABRINE DEFOAM ™ defoamer | 0.18 lb | 0.082 kg |
| Crosslinked Polymer | 8 lb | 3.6 kg |
| BARABUF ™ buffer | 1 lb | 0.45 kg |
| BARACARB 5 ™ sized bridging agent | 32 lb | 14.5 kg |
| BARACARB 25 ™ sized bridging agent | 8 lb | 3.6 kg |
| K-34 ™ pH buffer | 3.76 lb | 1.70 kg |
| GEL-STA ™ oxygen scavenger | 5.58 lb | 2.53 kg |

The drill-in muds according to the formula in Table 1 with various crosslinked polymers were hot-rolled at 177° C. (350° F.) or 204° C. (400° F.) for 16 hours. Rheology data after hot rolling was obtained at 49° C. (120° F.) with FANN™ Model 35. Fluid loss after hot rolling was measured on 20 μm (micrometer) ceramic discs at either 177° C. (350° F.) or 204° C. (400° F.).

Table 2 shows the fluid properties for a 50:50 NVP/AM copolymer with two different crosslinkers (MBAM and PAE) after hot rolling. The table shows that MBAM is unacceptable because it will hydrolyze at the test temperatures. The polymer crosslinked with PAE provides better thermal stability, that is, higher viscosity and lower filtrate volume after aging at 204° C. (400° F.).

TABLE 2

Comparison of fluid properties for NVP/AM copolymer with different crosslinkers

| | NVP/AM Molar Ratio | | | |
|---|---|---|---|---|
| | 50/50 | | 50/50 | |
| | Crosslinker | | | |
| | MBAM | | PAE | |
| Crosslinker mol % | 1 | | 1 | |
| Hot-roll temperature | 177° C. (350° F.) | 204° C. (400° F.) | 177° C. (350° F.) | 204° C. (400° F.) |
| Rheology at 49° C. (120° F.) after hot-rolling for 16 hours | | | | |
| 600 rpm, lb/100 ft² | 70 | 32 | 87 | 78 |
| 300 rpm, lb/100 ft² | 42 | 14 | 56 | 50 |
| 200 rpm, lb/100 ft² | 32 | 9 | 44 | 39 |
| 100 rpm, lb/100 ft² | 19 | 4 | 29 | 25 |
| 6 rpm, lb/100 ft² | 3 | 1 | 5 | 4 |
| 3 rpm, lb/100 ft² | 2 | 1 | 4 | 3 |
| 10 sec gel, lb/100 ft² | 2 | 1 | 5 | 3 |
| 10 min gel, lb/100 ft² | 3 | 1 | 5 | 3 |
| PV, cP | 28 | 18 | 31 | 28 |
| Yield Point, lb/100 ft² | 14 | — | 25 | 22 |
| HTHP fluid loss after 30 minutes, 20 μm ceramic disc | | | | |
| Filtration temperature | 177° C. (350° F.) | 204° C. (400° F.) | 177° C. (350° F.) | 204° C. (400° F.) |
| Filtrate volume, ml | 20 | 60 | 20 | 29 |

Table 3 shows the effect of concentration of the PAE crosslinker with a copolymer of NVP/AM. As shown in Table 3, the PAE crosslinker concentration is preferably at least 1 mol % based on total monomers of the NVP/AM copolymer to achieve a desirable viscosity and fluid-loss control (determined as filtrate volume).

TABLE 3

Effect of PAE mol % on the fluid properties after aging

| | NVP/AM Molar Ratio | | | | | |
|---|---|---|---|---|---|---|
| | 50/50 | | | | | |
| | Crosslinker | | | | | |
| | PAE | | | | | |
| Crosslinker mol % | 0 | 0.5 | 1 | 1.5 | 2 | 3 |
| Hot Rolling Temp. | 177° C. (350° F.) | | | | | |
| Rheology at 49° C. (120° F.) after hot-rolling for 16 hours | | | | | | |
| 600 rpm, lb/100 ft² | 17 | 47 | 87 | 92 | 108 | 93 |
| 300 rpm, lb/100 ft² | 8 | 27 | 56 | 61 | 75 | 64 |
| 200 rpm, lb/100 ft² | 6 | 19 | 44 | 48 | 61 | 51 |
| 100 rpm, lb/100 ft² | 3 | 11 | 29 | 32 | 42 | 35 |
| 6 rpm, lb/100 ft² | 1 | 2 | 5 | 8 | 12 | 10 |
| 3 rpm, lb/100 ft² | 1 | 1 | 4 | 6 | 10 | 9 |
| 10 sec gel, lb/100 ft² | 1 | 1 | 5 | 7 | 10 | 9 |
| 10 min gel, lb/100 ft² | 1 | 1 | 5 | 7 | 10 | 9 |
| PV, cP | 9 | 20 | 31 | 31 | 33 | 29 |
| Yield Point, lb/100 ft² | — | 7 | 25 | 30 | 42 | 35 |
| HTHP fluid loss after 30 minutes, 20 μm ceramic disc | | | | | | |
| Filtration Temperature | 177° C. (350° F.) | | | | | |
| Filtrate volume, ml | NC | 48 | 20 | 20 | — | 20 |

Table 4 shows the fluid properties for copolymers with different NVP/AM ratios crosslinked with 1 mol % PAE (based on the NVP/AM monomers) before and after hot-rolling at 204° C. (400° F.) for 16 hours. It can be seen that even 10 mol % of NVP can help prevent the precipitation of the crosslinked NVP/AM copolymer after this aging. The viscosity and the fluid loss (determined as filtrate volume) of the fluid can be controlled by the amount of NVP, with the NVP in the range of about 20 mol % to about 50 mol % being preferred.

TABLE 4

Effect of NVP/AM ratio with PAE crosslinker before and after hot rolling

| | \multicolumn{14}{c|}{NVP/AM mole ratio} |
|---|---|---|---|---|---|---|---|---|---|---|---|---|---|---|
| | \multicolumn{2}{c|}{0/100} | \multicolumn{2}{c|}{10/90} | \multicolumn{2}{c|}{20/80} | \multicolumn{2}{c|}{30/70} | \multicolumn{2}{c|}{40/60} | \multicolumn{2}{c|}{50/50} | \multicolumn{2}{c|}{60/40} |

Crosslinker: PAE
Crosslinker mol %: 1
Hot Rolling Temp.: 204° C. (400° F.)

Rheology at 49° C. (120° F.) before and after hot-rolling for 16 hours

| Before (B) or After (A) Hot Rolling | B | A | B | A | B | A | B | A | B | A | B | A | B | A |
|---|---|---|---|---|---|---|---|---|---|---|---|---|---|---|
| 600 rpm, lb/100 ft² | 240 | Complete mud separation | 238 | 226 | 226 | 237 | 211 | 230 | 88 | 123 | 46 | 78 | 19 | 18 |
| 300 rpm, lb/100 ft² | 196 | | 193 | 155 | 203 | 160 | 169 | 157 | 60 | 83 | 30 | 50 | 12 | 9 |
| 200 rpm, lb/100 ft² | 174 | | 173 | 125 | 179 | 129 | 148 | 127 | 48 | 66 | 23 | 39 | 10 | 6 |
| 100 rpm, lb/100 ft² | 143 | | 140 | 87 | 141 | 90 | 113 | 90 | 33 | 45 | 15 | 25 | 7 | 4 |
| 6 rpm, lb/100 ft² | 44 | | 45 | 20 | 43 | 24 | 33 | 24 | 9 | 11 | 4 | 4 | 3 | 1 |
| 3 rpm, lb/100 ft² | 35 | | 40 | 14 | 35 | 18 | 26 | 18 | 7 | 8 | 3 | 3 | 2 | 1 |
| 10 sec gel, lb/100 ft² | 38 | | 41 | 14 | 35 | 18 | 26 | 18 | 7 | 8 | 3 | 3 | 2 | 1 |
| 10 min gel, lb/100 ft² | 38 | | 41 | 15 | 35 | 18 | 26 | 18 | 7 | 8 | 3 | 3 | 2 | 1 |
| PV, cP | 44 | | 45 | 71 | 23 | 77 | 42 | 73 | 28 | 40 | 16 | 28 | 7 | 9 |
| Yield Point, lb/100 ft² | 152 | | 148 | 84 | 180 | 83 | 127 | 84 | 32 | 43 | 14 | 22 | 5 | 0 |

HTHP fluid loss after 30 minutes, 20 μm ceramic disc

| Filtration Temp. | \multicolumn{14}{c|}{204° C. (400° F.)} |
|---|---|---|---|---|---|---|---|---|---|---|---|---|---|---|
| Filtrate volume, ml | — | | \multicolumn{2}{c|}{28} | \multicolumn{2}{c|}{20} | \multicolumn{2}{c|}{14} | \multicolumn{2}{c|}{20} | \multicolumn{2}{c|}{29} | — | |

Table 5 shows the difference between two crosslinkers (MBAM and PAE) with another copolymer. It clears shows that PAE is much better than MBAM in terms of viscosity enhancement and thermal stability.

TABLE 5

Comparison of fluid properties for NVP/AM/AMPS polymer with different crosslinkers

| | \multicolumn{2}{c|}{NVP/AM/AMPS Molar Ratio} |
|---|---|---|
| | 30/20/50 | 30/20/50 |
| | \multicolumn{2}{c|}{Crosslinker} |
| | MBAM | PAE |
| Crosslinker mol % | 2 | 2 |
| Hot-roll temperature | 204° C. (400° F.) | 204° C. (400° F.) |

Rheology at 49° C. (120° F.) before and after hot-rolling for 16 hours

| Before (B) or After (A) Hot Rolling | B | A | B | A |
|---|---|---|---|---|
| 600 rpm, lb/100 ft² | 26 | 6 | 85 | 49 |
| 300 rpm, lb/100 ft² | 16 | 3 | 56 | 30 |
| 200 rpm, lb/100 ft² | 12 | 2 | 43 | 22 |
| 100 rpm, lb/100 ft² | 8 | 2 | 28 | 13 |
| 6 rpm, lb/100 ft² | 2 | 1 | 6 | 3 |
| 3 rpm, lb/100 ft² | 1 | 1 | 5 | 2 |
| 10 sec gel, lb/100 ft² | 3 | 1 | 5 | 2 |
| 10 min gel, lb/100 ft² | 3 | 1 | 5 | 2 |
| PV, cP | 10 | 3 | 29 | 19 |
| Yield Point, lb/100 ft² | 6 | 0 | 27 | 11 |

HTHP fluid loss after 30 minutes, 20 μm ceramic disc

| Filtration temperature | 177° C. (350° F.) | 177° C. (350° F.) |
|---|---|---|
| Filtrate volume, ml | — | 28 |

Table 6 shows that divinyl benzene (DVB) can also be used as the crosslinker with improved thermal stability.

TABLE 6

Effect of NVP/AM ratio with DVB crosslinker before and after hot rolling

| | NVP/AM Molar Ratio | | | | | |
|---|---|---|---|---|---|---|
| | 30/70 | | 40/60 | | 50/50 | |
| | Crosslinker | | | | | |
| | DVB | | DVB | | DVB | |
| | Crosslinker mol % | | | | | |
| | 1 | | 1 | | 1 | |
| | Hot-roll temperature | | | | | |
| | 204° C. (4000° F.) | | 204° C. (400° F.) | | 177° C. (350° F.) | |
| Rheology at 49° C. (120° F.) before and after hot-rolling for 16 hours | | | | | | |
| Before (B) or After (A) Hot Rolling | B | A | B | A | B | A |
| 600 rpm, lb/100 ft² | 42 | 72 | 42 | 69 | 14 | 19 |
| 300 rpm, lb/100 ft² | 29 | 58 | 28 | 41 | 8 | 10 |
| 200 rpm, lb/100 ft² | 23 | 37 | 23 | 32 | 6 | 7 |
| 100 rpm, lb/100 ft² | 15 | 23 | 16 | 22 | 3 | 4 |
| 6 rpm, lb/100 ft² | 6 | 6 | 6 | 7 | 1 | 1 |
| 3 rpm, lb/100 ft² | 4 | 5 | 5 | 6 | 1 | 1 |
| 10 sec gel, lb/100 ft² | 7 | 4 | 7 | 5 | 1 | 1 |
| 10 min gel, lb/100 ft² | 8 | 5 | 7 | 5 | 1 | 1 |
| PV, cP | 13 | 14 | 14 | 28 | 6 | 9 |
| Yield Point, lb/100 ft² | 16 | 44 | 14 | 13 | 2 | 1 |
| HTHP fluid loss after 30 minutes, 20 μm ceramic disc | | | | | | |
| Filtration temperature | 177° C. (350° F.) | | 177° C. (350° F.) | | 177° C. (350° F.) | |
| Filtrate volume, ml | 19 | | 22 | | — | |

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of composition, design, or steps herein shown, other than as described in the claims.

What is claimed is:

1. A method comprising the steps of:
   (A) forming a fluid comprising a crosslinked polymer, wherein the crosslinked polymer comprises:
      (i) a first monomeric unit of one or more N-vinyl lactams;
      (ii) a second monomeric unit; and
      (iii) a crosslinker selected from the group consisting of: 1,3-divinylimidazolidin-2-one, divinyltetrahydropyrimidin-2(1H)-one, dienes, N-vinyl-3(E)-ethylidene pyrrolidone, ethylidene bis(N-vinylpyrrolidone), and any combination of any of the foregoing, wherein the crosslinker is present in an amount of from about 1 mol % to about 5 mol % of a total of the first and second monomeric units; and
   (B) introducing the fluid into a portion of a well, wherein a design temperature of the portion of the well is at least 149° C. (300° F.).

2. The method according to claim 1, wherein the second monomeric unit is selected from the group consisting of: acrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, and any combination of any of the foregoing.

3. The method according to claim 1, wherein the fluid comprises an aqueous phase.

4. The method according to claim 3, wherein the aqueous phase comprises one or more water-soluble salts dissolved in water.

5. The method according to claim 3, wherein the fluid comprises a solid particulate.

6. The method according to claim 3, wherein the fluid comprises less than 2% clay by weight of the water.

7. The method according to claim 1, wherein the one or more N-vinyl lactams are selected from the group consisting of: N-vinylpyrrolidone (NVP), N-vinylcaprolactam, and any combination thereof.

8. The method according to claim 1, wherein the second monomeric unit is selected from the group consisting of:

acrylamide, acrylic acid, 2-acrylamido-2-methylpropanesulfonic acid (AMPS), and any combination of any of the foregoing.

9. The method according to claim 1, wherein the first monomeric unit is at least 5 mol % of the second monomeric unit.

10. The method according to claim 1, wherein the second monomeric unit comprises up to 90 mol % of the monomeric units of the crosslinked polymer.

11. The method of claim 1, wherein the crosslinked polymer is a copolymer that consists of the first monomeric unit, the second monomeric unit, and the crosslinker.

12. The method of claim 1, wherein introducing the fluid into the portion of the well further comprises using the drilling fluid to drill a portion of a wellbore penetrating a subterranean formation.

13. A method comprising the steps of:
(A) forming a fluid comprising a crosslinked polymer, wherein the crosslinked polymer comprises:
  (i) a first monomeric unit of one or more N-vinyl lactams; and
  (ii) a crosslinker selected from the group consisting of: divinyl ether, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), and any combination of any of the foregoing, wherein the crosslinker is present in an amount of from about 1 mol % to about 5 mol % of a total of the first monomeric unit; and
(B) introducing the fluid into a portion of a well, wherein a design temperature of the portion of the well is at least 149° C. (300° F.).

* * * * *